(12) United States Patent
Denker et al.

(10) Patent No.: US 6,757,704 B1
(45) Date of Patent: Jun. 29, 2004

(54) LINKED CALL FORWARDING

(75) Inventors: John S. Denker, Leonardo, NJ (US); Donnie Henderson, Manalapan, NJ (US)

(73) Assignee: AT&T Corp., New York, NY (US)

( * ) Notice: Subject to any disclaimer, the term of this patent is extended or adjusted under 35 U.S.C. 154(b) by 602 days.

(21) Appl. No.: 09/618,279

(22) Filed: Jul. 18, 2000

(51) Int. Cl.[7] .............................................. G06F 15/16
(52) U.S. Cl. ...................................... 709/202; 370/352
(58) Field of Search ............................ 370/352; 379/85, 379/88.01; 709/202

(56) References Cited

U.S. PATENT DOCUMENTS 3,854,013 A * 12/1974 Altenburger et al. .. 379/221.02

6,445,694 B1 * 9/2002 Swartz ........................ 370/352

* cited by examiner

*Primary Examiner*—David Y. Eng

(57) ABSTRACT

A system for synchronized call forwarding of an incoming call from any of a plurality of telephones includes receiving a synchronized call forwarding command at a first telephony device, sending the synchronized call forwarding command from the first telephony device to a second telephony device over a first network, receiving a telephone call at the second telephony device over a second network, and forwarding the incoming call in accordance with the synchronized call forwarding command received from the first telephony device over the second network.

26 Claims, 4 Drawing Sheets

LINKED CALL FORWARDING

FIELD OF THE INVENTION

The present invention relates generally to forwarding telephone calls. More particularly, the present invention relates to a method and apparatus for call forwarding from a plurality of different telephones lines to a single call-forwarded telephone number.

BACKGROUND OF THE INVENTION

Many office workers spend a sizable portion of their day outside their base office or away from their office telephone. For example, workers may be at other locations within their office building, outside their office building at remote sites, or in transit between sites. In all cases there is often a need to stay "connected" with the office telephone system, having the ability to receive calls that would normally go to the office phone. Call forwarding is one of the most prevalent and valuable features for telephony users in the office or home settings and in mobile settings.

Today, call forwarding is typically provided as a telephone system service by a local office/building PBX or by a telephony central office. The most basic operation is that a user can somehow signal this feature and cause calls going to their office phone, to be redirected to another phone.

In one typical system, as shown in FIG. 1, a user activates call forwarding by entering a sequence of button-presses on the keypad and/or button set of their office telephone 30. This button press sequence usually includes call forwarding on/off codes and a "forward-to" number. As shown in FIG. 1, once call forwarding has been activated, inbound calls are forwarded from office telephone 30 to remote telephone 15 via a switching network 10 such as public switched telephone network (PSTN). Switching network 10 includes a switch 6 that performs the call forwarding functionality. Operationally, the user normally activates call forwarding at his office location just before leaving his office and similarly disables call forwarding upon returning to the office.

Another common call forwarding scenario exists where a user has more than one office location. As shown in FIG. 2, the user may have an office telephone 30 in a first location as well as another office telephone 31 in a location different from office telephone 30. The user may desire to forward calls from both office telephones 30, 31 to a remote telephone 15 via switching network 10. This requires the user to activate call forwarding at each location where the office telephones 30, 31 are located. Thus, a user having more than one office telephone, either manually sets up call forwarding at each office or forgoes the call forwarding feature for particular office locations. Moreover, if a user wants to forward calls from his home telephone, office telephone, and mobile telephone, to another telephone, the user would have to perform this time consuming task at each location.

Existing call forwarding systems also enable remote control of call forwarding as well. For example, one remotely controlled call forwarding system requires a user to dial a special service number that is associated with the call forwarding system for their office phone. Next, the user enters required PIN codes, forwarding on/off codes, forward-to numbers, etc., using the touch tone pad of the phone from which the user is calling. As a result, the user is able to use another telephone to remotely control the forwarding of calls originally destined to a first telephone that is remote from the "another telephone".

In each of the above-mentioned systems, however, the user is required to enter a complex sequence of codes or button-presses. Many users find this difficult to perform, and consequently do not regularly forward their telephone calls. Moreover, when a user has multiple telephones, the user must perform the time consuming task of call forwarding for each telephone, whether locally or remotely, in order for each of his/her incoming calls to reach one desired telephone.

The present invention is therefore directed to the problem of developing a synchronized call forwarding system that can control forwarding for all multiple telephones in a simple, efficient and easily understood manner.

SUMMARY OF THE INVENTION

The present invention solves this problem by allowing a user to call forward calls from a plurality of different telephones lines to one single telephone in one easy operation.

According to the present invention, a system for performing the method for synchronized call forwarding of an incoming call from any of a plurality of telephones includes receiving a synchronized call forwarding command at a first telephony device, sending the synchronized call forwarding command from the first telephony device to a second telephony device over a first network, receiving a telephone call at the second telephony device over a second network, and forwarding the incoming call in accordance with the synchronized call forwarding command received from the first telephony device over the second network.

BRIEF DESCRIPTION OF THE DRAWINGS

For a more complete understanding of the present invention, reference is now made to the following descriptions taken in conjunction with the accompanying drawings, in which.

DETAILED DESCRIPTION

The present invention provides synchronized or linked call forwarding services for a plurality of telephones based on available telephony and computing resources using an application program that allows a user to redirect inbound telephone calls from multiple telephones to a single telephone. As used herein, this application program will be referred to as the tel-controller application or "TCAPP", which can be easily implemented on a computer, server, office switch, private branch exchange (PBX), etc.

Synchronized or linked call forwarding can be accomplished in a single user operation. Thus, the user does not have to perform (either locally or remotely) time consuming call forwarding procedures for each telephone, as explained above in order to have all of his/her inbound calls forwarded to one telephone. As used herein "telephone" is not limited strictly to the equipment which effects a call but is broad enough to include the telephone number or address of a communications device.

Figure 3:
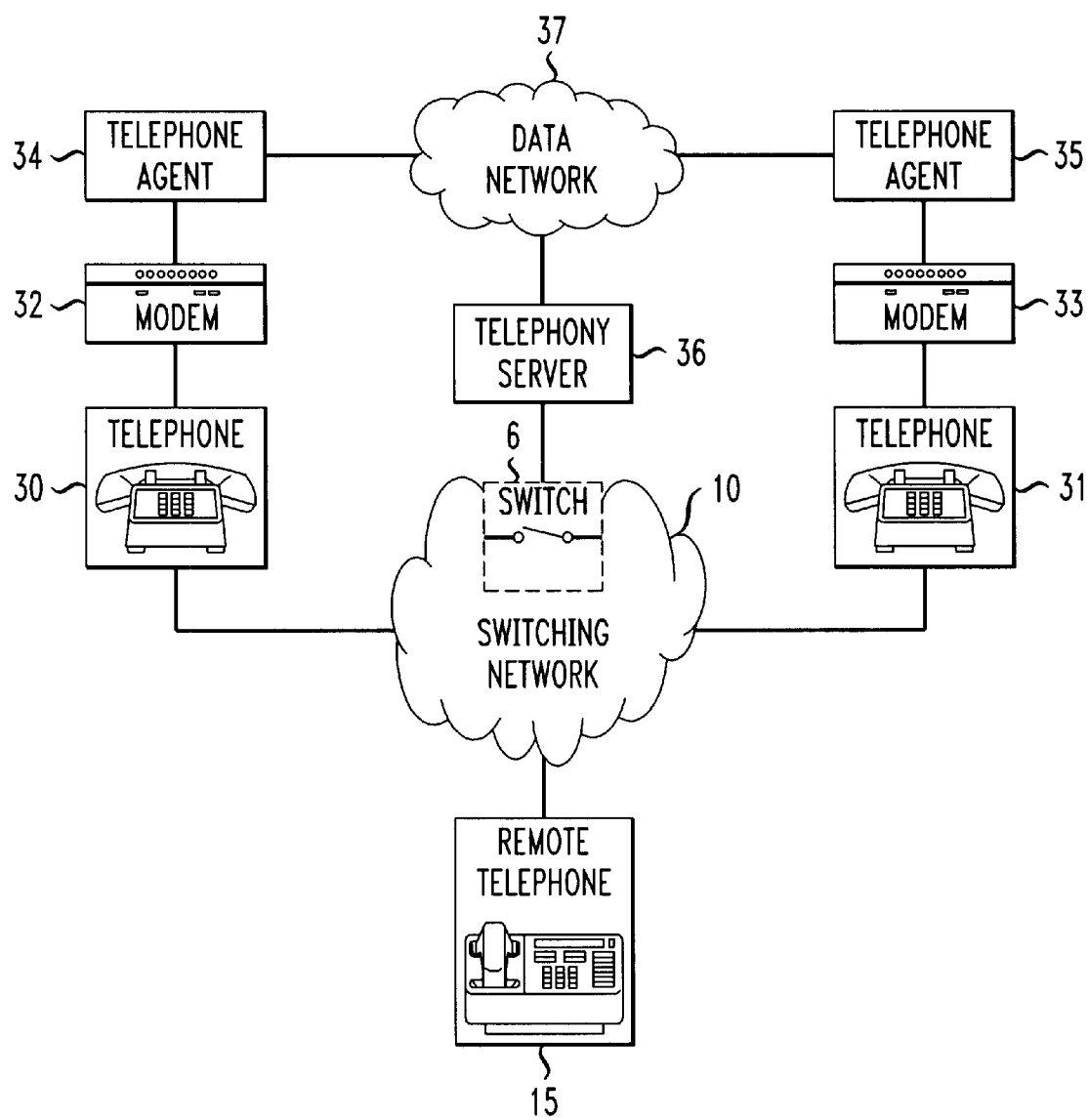
FIG. 3 depicts one exemplary embodiment of the system according to the present invention.

FIG. 3 depicts one exemplary embodiment of a system 300 of the present invention. A telephone 30 is coupled to a modem 32 which is connected to a telephone agent 34 and a switching network 10 to which a remote telephone 15 is coupled. Similarly, telephone 31 is coupled to modem 33 which is connected to a telephone agent 35 and a switching network 10. The combination of the telephone agent and the telephone coupled by the modem may be referred to as a telephony device. In one exemplary embodiment an AT&T ISDN telephone could be connected to the telephone agent. In addition, an integrated telephone/telephone agent could be used.

According to the present invention, telephones 30 and 31 have different telephone numbers and may be remotely located from each other. For example, telephone 30 may be located at a user's permanent residence and telephone 31 may located at a user's summer residence.

In one embodiment of the present invention, switching network 10 may be a Public Switched Telephone Network (PSTN) or any voice telephone network which is used in the transmission and reception of voice signals.

Telephone agents 34 and 35 may be any multi-purpose computer or any other data communication device. Telephone agents 34 and 35 include a processor and a memory for executing and storing commands. Telephone agents 34 and 35 are also coupled to a data network 37. According to the present invention, data network 37 may be a local area network (LAN), a wide area network (WAN) or the Internet. According to the present data network 37 may be any network which transmits data using packet switching. Data network 37 is connected to a telephony server 36 which is also connected to a switch 6 of switching network 10. Switch 6 may provide various telephony services such as call-waiting, call forwarding, etc.

According to an embodiment of the present invention, telephony server 36 is defined as a computer having the capability of controlling, adding intelligence, storing, forwarding and manipulating data, voice, fax. e-mail, etc. calls flowing into and out of a computer telephony system. In one embodiment of the present invention, telephony server 36 forwards commands from various network components such as telephone agents 34 and 35.

The synchronized call forwarding feature of the present invention operates as follows. System 300 of the present invention includes TCAPP. A TCAPP controller operates at either telephone agent 34 or 35 and is designated as the linked-call-forward (LCF) command transmitter. The other telephone agent 34 or 35 is then designated as the LCF command receiver. Although two telephony devices are shown in FIG. 3, multiple telephony devices may be incorporated in system 300 without departing from the spirit and scope of the present invention.

Telephony server 36 includes an application programming interface (API). As used herein, an API is defined as a set of functions and values used by one program to communicate with another program. More particularly, an API is a hook into software which is a set of standard software interrupts, calls, and data formats that application programs use to initiate contact with network services, mainframe communications programs, telephone equipment or program-to-program communications. Thus, telephony server 36 uses the API to interpret commands from telephone agents 34 and 35.

A user at telephone 30, activates call forwarding from his/her telephone to a remote telephone 15 by enter a command via telephone agent 34 such as:

forward_on <forwarding number>, wherein the forwarding number is the telephone number of remote telephone 15.

Figure 1:
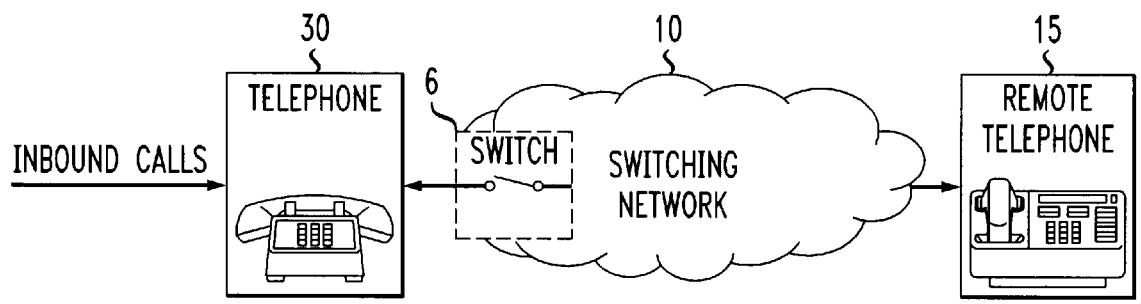
FIG. 1 depicts a known call forwarding system.
Figure 2:
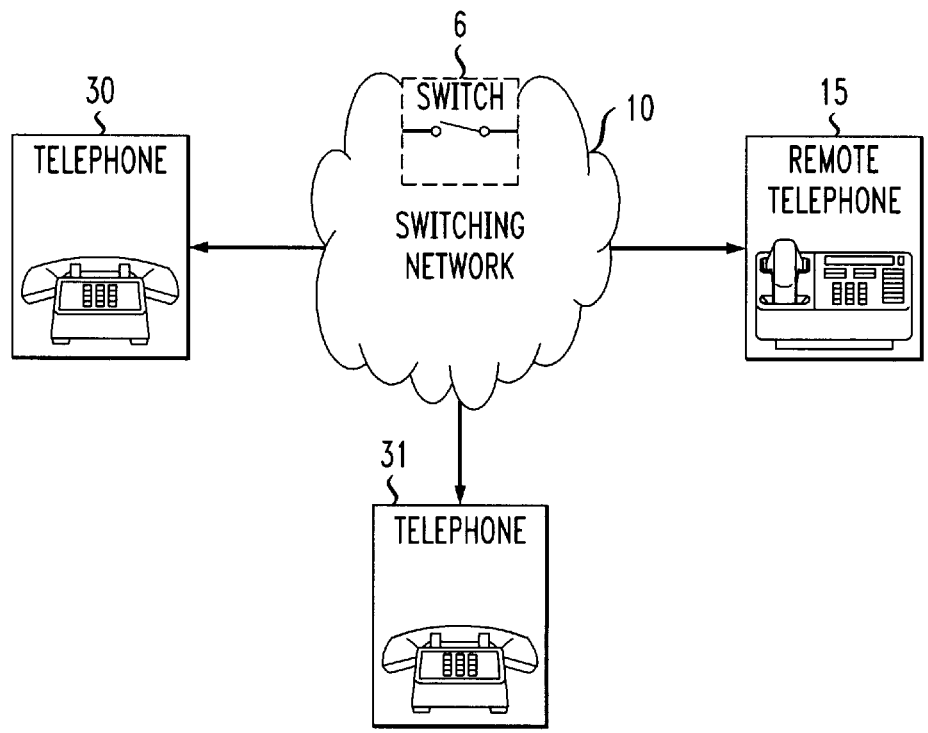
FIG. 2 depicts a known call forwarding system.

Remote telephone 15 can be a wire-line telephone located at the user's office for example or a wireless cellular or mobile telephone. This command is sent to telephony server 36 and then sent to switch 6 of switching network 10. Switch 6 receives the command and activates call forwarding for telephone 30. Alternatively, the user can activate call forwarding as shown in FIG. 1 by calling a predetermined number sequence and activating call forwarding for telephone 30.

Synchronized call forwarding is activated as follows. The user at telephone 30, launches synchronized call forwarding by entering a command via telephone agent 34 such as:

forward_on <forwarding number>, <message sender's ID> wherein the forwarding number is the telephone number of remote telephone 15 and the message sender's ID is an ID of telephone agent 34.

The command could include other information such as the telephone agents to receive the command, a timer to activate/deactivate synchronized call forwarding, etc. This command is sent to data network 37. Data network 37 receives the command and sends the command to telephone agent 35. Telephone agent 35 operates as a TCAPP receiver. Upon receiving the command, telephone agent 35 sends a request to telephony server 36 to have all inbound calls to telephone 31 redirected to the telephone indicated in the command from telephone agent 34. Call forwarding may stay in effect for a predetermined time interval. The user, via the TCAPP command, sets the time interval.

According to the present invention, agent 34 can transmit commands to each telephone agent, such as telephone agent 35, designated by the user. Moreover, the user can utilize other options available with the synchronized call forwarding system. For example, synchronized call forwarding can be automatically turned off or "timed out" after a user-specified time period, such as the end of the work day, end of the work week, etc. The system 300 could also include a default time, such as midnight, at which time the system would disable all call forwarding unless instructed to the contrary. Moreover, the system is capable of assigning different turn off periods for different telephones.

In addition, synchronized call forwarding could be set up such that only selected telephones would participate in the synchronized call forwarding procedure. For example, a user may desire synchronized call forwarding for all telephones except for his/her summer home telephone.

The present invention is a simple, non-complex useful means of controlling call forwarding such that call forwarding can be performed on a plurality of telephones in one operation by the user.

Variations of the synchronized call forwarding system are possible. In an exemplary embodiment shown in FIG. 4, a PBX 400 is coupled between switching network 10 and telephone 30. PBX 400 is also coupled to telephone server 36 which is connected to data network 37. Similarly, a PBX 410 is coupled between switching network 10 and telephone 31. PBX 401 is also coupled to telephone server 38 which is connected to data network 37. Remote telephone 15 is coupled in the normal manner to switching network 10.

Figure 4:
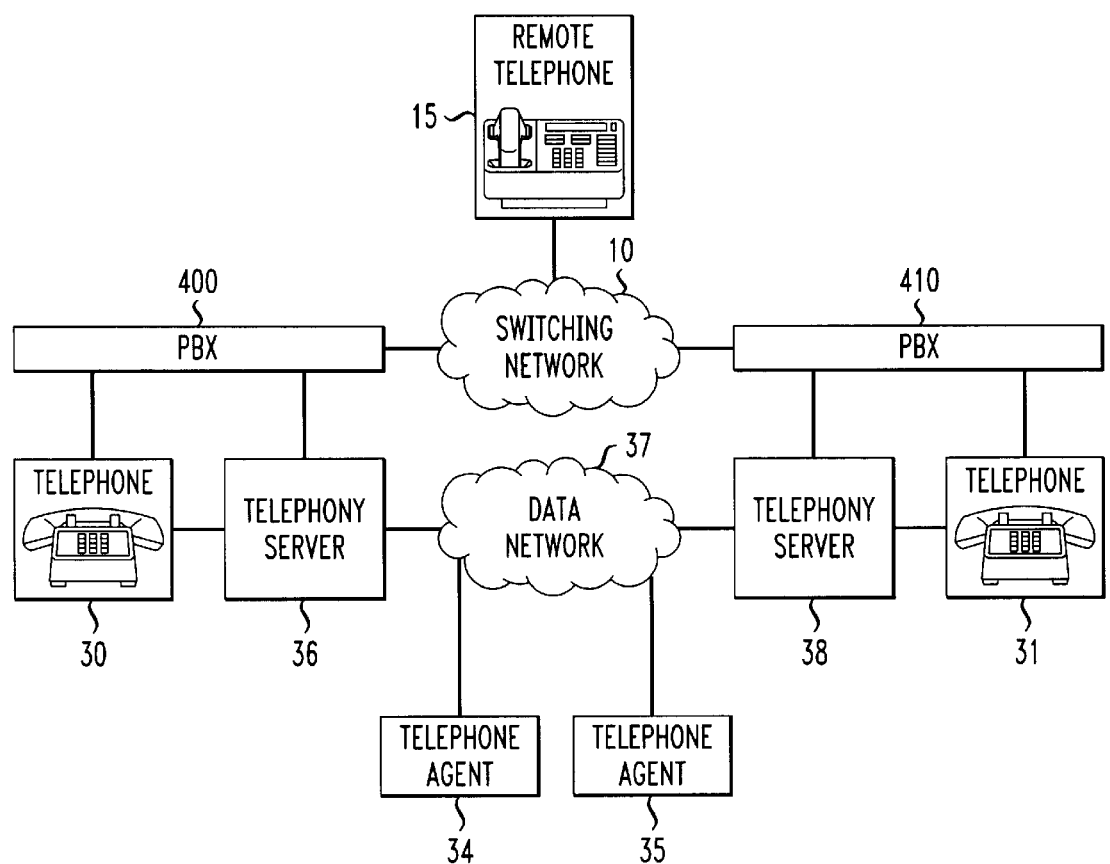
FIG. 4 depicts an exemplary embodiment of the system according to the present invention.

A user can activate call forwarding at telephone 30 or 31 in a similar manner discussed above. In FIG. 4, PBX 400 and 410 operate in a similar manner as switch 6. For example, PBX 400 and 401 communicate with telephone servers 36 and 38, respectively, to receive commands from telephone agents 34 and 35. These commands instruct the PBXs 400 and 401 to redirect inbound calls from telephones 30 or 31 to a remote telephone 15. The operation of synchronized call forwarding operates in the same manner discussed above in that a TCAPP command is sent from a designated TCAPP controller to a designated TCAPP receiver activating call forwarding.

Figure 5:
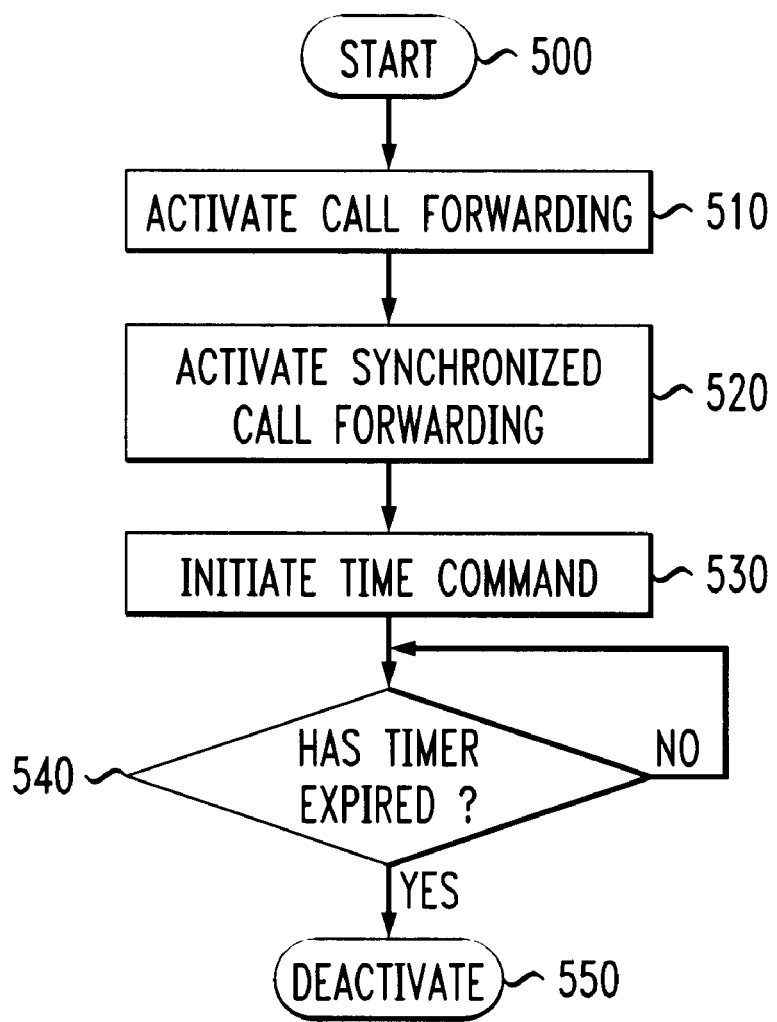
FIG. 5 depicts a flow chart of the present invention.

FIG. 5 depicts an exemplary embodiment of the method according to the present invention. The method starts at step 500. The user activates call forwarding for a particular telephone at step 510. This may be accomplished by using a telephone agent 34 or 35 of FIG. 4. The telephone agent may include a user interface system including an input/output device such as a keyboard, or a mouse/display combination. The user may also include commands which limit the duration of call forwarding for the particular telephone or other commands. Once call forwarding has been activated, the process moves to the next step 520.

In step 520, the user activates synchronized call forwarding. The user enters a command which instructs telephone agents 34 or 35 of FIG. 4 acting as TCAPP receivers to redirect inbound calls to their associated telephones. Thus the TCAPP receivers communicate with a switch providing call-forwarding capabilities to redirect calls to the telephone indicated in the command of the TCAPP controller.

In addition, the synchronized call forwarding system can perform the following.

In step 530, the TCAPP controller initiates in its command a timer function for one or all of the TCAPP receives. In step 540, the TCAPP checks to see if the timer has expired, and if so, the process moves to step 550 and deactivates call forwarding, which is accomplished by transmitting a command from the telephone agents to the switch. Alternatively, the switch could receive an initial command which includes a shut off time. If the timer has not yet expired, the process simply waits and rechecks the timer. After deactivation, the process ends.

According to the present invention, a user does not necessarily have to activate call forwarding for his present telephone before launching synchronized call forwarding for the remainder of his telephones. For example, a user can simply launch synchronized call forwarding from his present telephone and have all inbound calls to the other telephones redirected to a remote telephone. Thus, all telephones except the present telephone would be synchronized.

Call forwarding is one of the most essential and useful telephone features. The present invention provides a service for making call forwarding easier to use and more approachable for a typical user by synchronizing call forwarding for a plurality of telephones such that the user does not have to activate call forwarding for each of his/her telephones. The method of the present invention has applications in local office telephone systems as well as home use.

Although the present invention has been described in detail, those skilled in the art should understand that they can make various changes, substitutions and alterations herein without departing from the spirit and scope of the invention in its broadest form.

What is claimed is:

1. A method for activating call forwarding of an incoming call from any of a plurality of telephones to one call-forward telephone, the method comprising the steps of:

generating a synchronized call forwarding command at a first telephone of the plurality of telephones;

receiving a synchronized call forwarding command at a first telephony device associated with said first telephone of said plurality of telephones sending the synchronized call forwarding command from the first telephony device to a plurality of telephone devices associated with the remaining telephones of said plurality of telephones, said command requesting all incoming calls to said plurality of telephones to be forwards to said one call-forward telephone, said command transmitted over a first network;

receiving a telephone call at one of said telephones of said plurality of telephones, said call received via a second network; and forwarding the incoming call in accordance with the synchronized call forwarding command received from the first telephony device over the second network to said one call-forward telephone.

2. The method according to claim 1, further comprising the step of changing a state of the synchronized call forwarding upon receiving the synchronized call forwarding command.

3. The method according to claim 1, wherein the first network is a data network.

4. The method according to claim 3, wherein the data network is a local area network (LAN).

5. The method according to claim 3, wherein the data network is a wide area network (WAN).

6. The method according to claim 3, wherein the data network is an Internet network.

7. The method according to claim 1, wherein the second network is a switching network.

8. The method according to claim 7, wherein the switching network is a public switched telephone network.

9. The method according to claim 1, wherein in the plurality of telephony devices each include a telephone agent.

10. The method according to claim 9, wherein each telephone device comprises a computer.

11. The method according to claim 1, further comprising the step of entering a duration period during which the synchronized call forwarding will remain activated.

12. The method according to claim 1, further comprising the step of using a default duration period to deactivate synchronized call forwarding if a user fails to specify a duration period.

13. The method according to claims 12, wherein the default duration period includes one selected from the following: an end of a workday, an end of a work week, a beginning of a workday, a beginning of a work week, midnight, and five o'clock in the morning.

14. The method according to claim 1, further comprising the steps of:

activating a timer upon sending the synchronized call forwarding command; and deactivating the call forwarding when the timer reaches a predetermined time.

15. A system for synchronized activating call forwarding of an incoming call from any of a plurality of telephony devices to a single call-forwarded telephone, the system comprising:

a first telephony device of said plurality of telephony devices adapted to transmit a synchronized call forwarding command over a first network; and the remaining telephony devices of said plurality of telephony devices adapted to receive the synchronized call forwarding command from the first telephone device, wherein the remaining telephony devices, upon receiving an incoming telephone call over a second network, forwards the incoming call to the call-forwarded telephone in accordance with the synchronized call forwarding command.

16. The system according to claim 15, wherein said first network is a data network.

17. The system according to claim 16, wherein the data network is a local area network (LAN).

18. The system according to claim 16, wherein the data network is a wide area network (WAN).

19. The system according to claim 16, wherein the data network is an Internet network.

20. The system according to claim 15, wherein the second network is a switching network.

21. The system according to claim 20, wherein the switching network is a public switched telephone network.

22. The system according to claim 15, wherein the plurality of telephone devices includes a telephone agent.

23. The system according to claim 15, wherein the plurality of telephone devices comprise a computer.

24. The system according to claim 15, wherein the synchronized call forwarding command includes a duration period during which synchronized call forwarding will remain activated.

25. The system according to claim 15, wherein the synchronized call forwarding command includes a default duration period to deactivate synchronized call forwarding if a user fails to specify a duration period.

26. The system according to claim 25, wherein the default duration period includes one selected from the following: an end of a workday, an end of a work week, a beginning of a workday, a beginning of a work week, midnight, and five o'clock in the morning.

* * * * *